US006194895B1

(12) United States Patent
Takahashi

(10) Patent No.: US 6,194,895 B1
(45) Date of Patent: Feb. 27, 2001

(54) ASYMMETRY MEASURING APPARATUS AND METHOD

(75) Inventor: Kazuaki Takahashi, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/292,684

(22) Filed: Apr. 15, 1999

(30) Foreign Application Priority Data

Apr. 17, 1998 (JP) ........................................ 10-108194

(51) Int. Cl.[7] ........................................ G01R 33/12

(52) U.S. Cl. ........................................ 324/212; 360/53

(58) Field of Search ........................................ 324/210, 212; 360/31, 45, 51, 53, 32

(56) References Cited

FOREIGN PATENT DOCUMENTS 1-94271 4/1989 (JP) .

*Primary Examiner*—Jay Patidar
(74) *Attorney, Agent, or Firm*—Scully, Scott, Murphy & Presser

(57) ABSTRACT

An asymmetry measuring apparatus is provided which comprises: dividing means for dividing read data output from a read data generator in data storing means; a DC level converter for converting the duty ratio of a signal divided by the dividing means to a DC voltage level; and DC voltage measuring means for measuring the output voltage of the DC level converter. By virtue of the above construction, the asymmetry measuring apparatus does not need a lot of time for measurement, causes no significant measurement error, is suitable for mass production, and creates no quantization error at the time of counting of a reference clock in time measurement.

5 Claims, 5 Drawing Sheets

ASYMMETRY MEASURING APPARATUS AND METHOD

FIELD OF THE INVENTION

The invention relates to a testing apparatus for floppy disk drives (hereinafter often abbreviated to "FDD"), and more particularly to an apparatus for measuring the asymmetry of reproduced output.

BACKGROUND OF THE INVENTION

In a waveform of read data output from FDD, a difference in time between the time T1 from the rise edge of read data RD1 to the rise edge of read data RD2 and the time T2 from the rise edge of read data RD2 to the rise edge of read data RD3, T1–T2, is called "waveform asymmetry" or "asymmetry" that is one of important characteristics in reproduction of data from floppy disks by means of FDD.

A conventional method for simply measuring the asymmetry is to directly measure time using an oscilloscope.

Another conventional method for measuring the asymmetry is disclosed in Japanese Patent Laid-Open No. 94271/1989. According to this conventional method, the time between edges of the read data pulse is measured with a clocking circuit. In this method, a reference clock pulse from a reference pulse generator is counted by means of a clocking circuit to determine the time between the read data pulses.

The above prior art methods have suffered from the following problems.

Specifically, in the measuring method using an oscilloscope, images displayed on the oscilloscope are always swung. Therefore, measuring point cannot be easily determined. This requires a lot of time and skill for the measurement. Further, large measurement errors and personal errors are created. Therefore, the conventional methods lack in reliability and are unsuitable for mass production.

Adoption of an oscilloscope having a time measuring function for mass production enables shortening of the measuring time and the measuring accuracy. This, however, poses a problem of increased cost due to necessity of investment in plant and equipment.

On the other hand, the method for measuring the time from edge to edge in read data pulses by means of a clocking circuit causes a counting error of pulses due to a correlation between two clocking circuits. Further, there is a possibility that a quantization error up to ± one period of the reference clock occurs at the time of rising to a unit/omission or rounding-off in clocking with the reference clock. In this case, the lower the frequency of the reference clock, the larger the time per period of the reference clock and the larger the error.

SUMMARY OF THE INVENTION

Accordingly, it is an object of the invention to solve the above problems of the prior art and to provide an asymmetry measuring apparatus which does not require a lot of time for the measurement and causes no significant measurement error and hence is suitable for mass production and, in addition, does not create a quantization error at the time of counting of the reference clock.

According to the first feature of the invention, an asymmetry measuring apparatus comprises:

dividing means for dividing read data output from a read data generator in data storing means;

a DC level converter for converting the duty ratio of a signal divided by the dividing means to a DC voltage level; and DC voltage measuring means for measuring the output voltage of the DC level converter.

The dividing means may be flip-flop.

The data storing means may be a floppy disk drive.

According to the second feature of the invention, an asymmetry measuring method comprises the steps of:

dividing read data read and output from data storing means;

converting the duty ratio of the divided signal to a DC voltage level; and measuring the DC voltage level.

BRIEF DESCRIPTION OF THE DRAWINGS

The invention will be explained in more detail in conjunction with appended drawings, wherein.

DESCRIPTION OF THE PREFERRED EMBODIMENTS

Before explaining the asymmetry measuring apparatus and method in preferred embodiments according to the invention, the aforementioned conventional asymmetry measuring methods will be explained in FIGS. 1 and 2.

Figure 1:
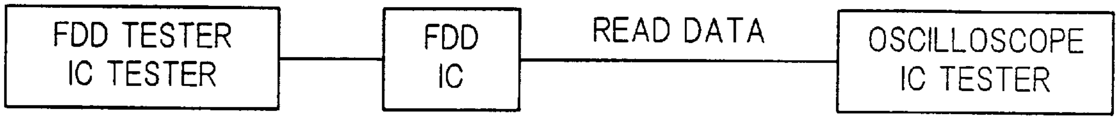
FIG. 1 is a block diagram showing one conventional asymmetry measuring method.

A conventional method for simply measuring the asymmetry is shown in FIG. 1. In this method, the time is directly measured using an oscilloscope.

Figure 2:
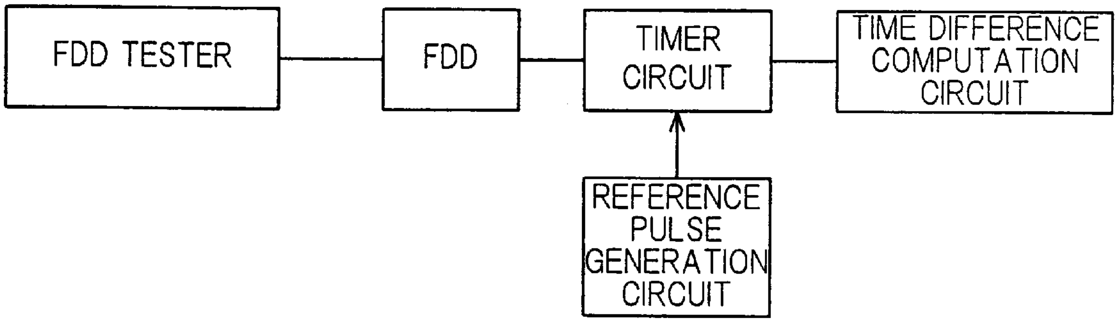
FIG. 2 is a block diagram showing another conventional asymmetry measuring method.

Another conventional method for measuring the asymmetry is shown in FIG. 2. According to this conventional method, the time between edges of the read data pulse is measured with a clocking circuit. In this method, a reference clock pulse from a reference pulse generator is counted by means of a clocking circuit to determine the time between the read data pulses.

Next, the asymmetry measuring apparatus and method in preferred embodiments of the invention will be explained in conjunction with FIGS. 3 to 8.

Figure 3:
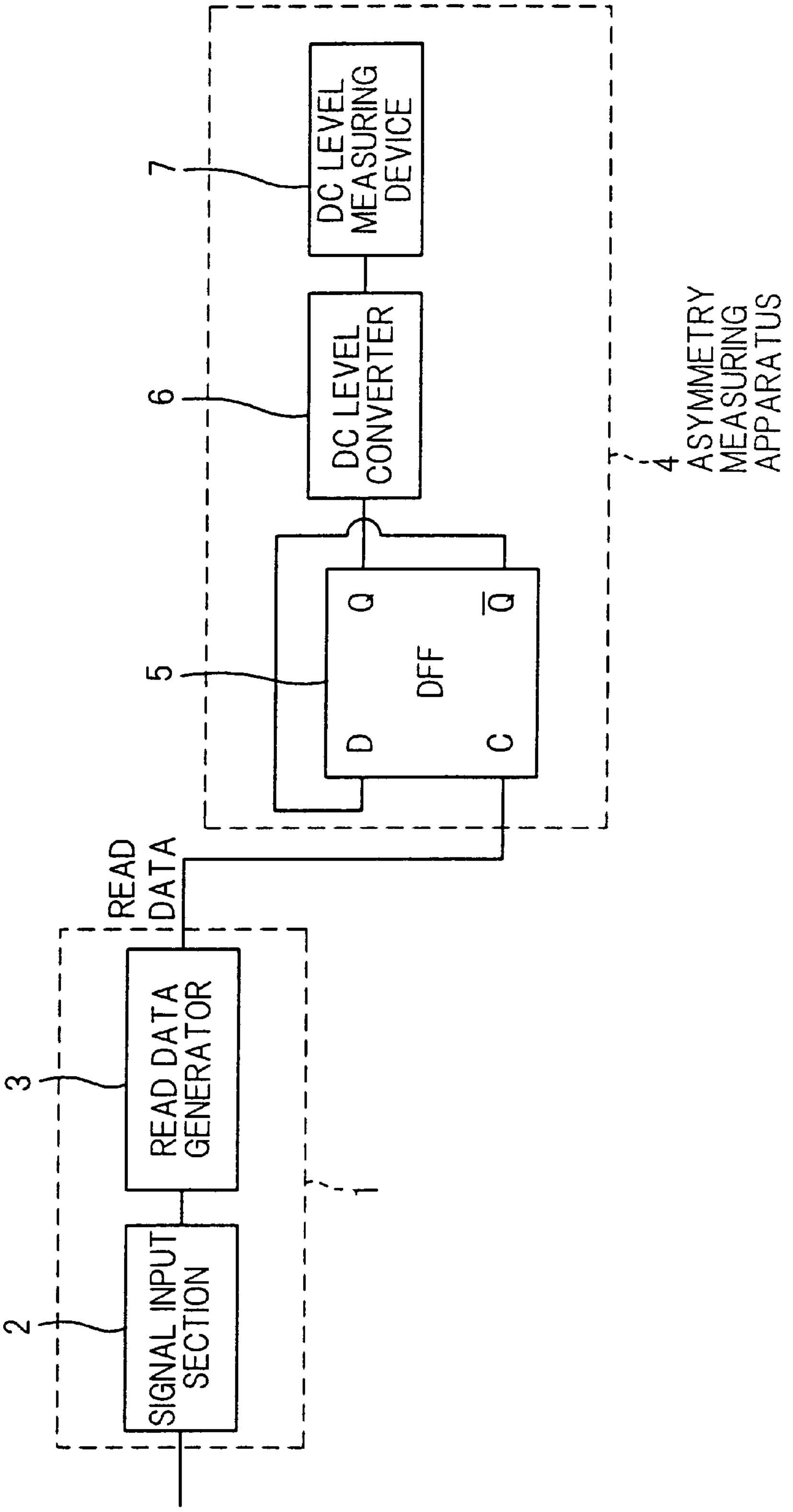
FIG. 3 is a block diagram showing one preferred embodiment of the invention.

FIG. 3 is a block diagram showing one preferred embodiment of the invention. In FIG. 3, numeral 1 designates FDD as a sample to be tested by the asymmetry measuring apparatus according to the invention. FDD 1 comprises a signal input section 2 and a read data generator 3. The input into FDD 1 is connected to the input of the signal input section 2. The output of the signal input section 2 is connected to the input of the read data generator 3. The output of the read data generator 3 is the output of the FDD 1.

Numeral 4 designates the asymmetry measuring apparatus of the invention. This asymmetry measuring apparatus 4 comprises a data flip-flop (hereinafter abbreviated to "DFF") 5, a DC level converter 6, and a DC level measuring device 7.

At the time of the measurement of asymmetry, the output of FDD 1 as the sample is connected to the input of the asymmetry measuring apparatus 4. The input of the asymmetry measuring apparatus 4 is input into DFF 5. The output of DFF 5 is connected to the input of the DC level converter 6. The output of the DC level converter 6 is connected to the input of the DC level measuring apparatus 7.

Figure 4:
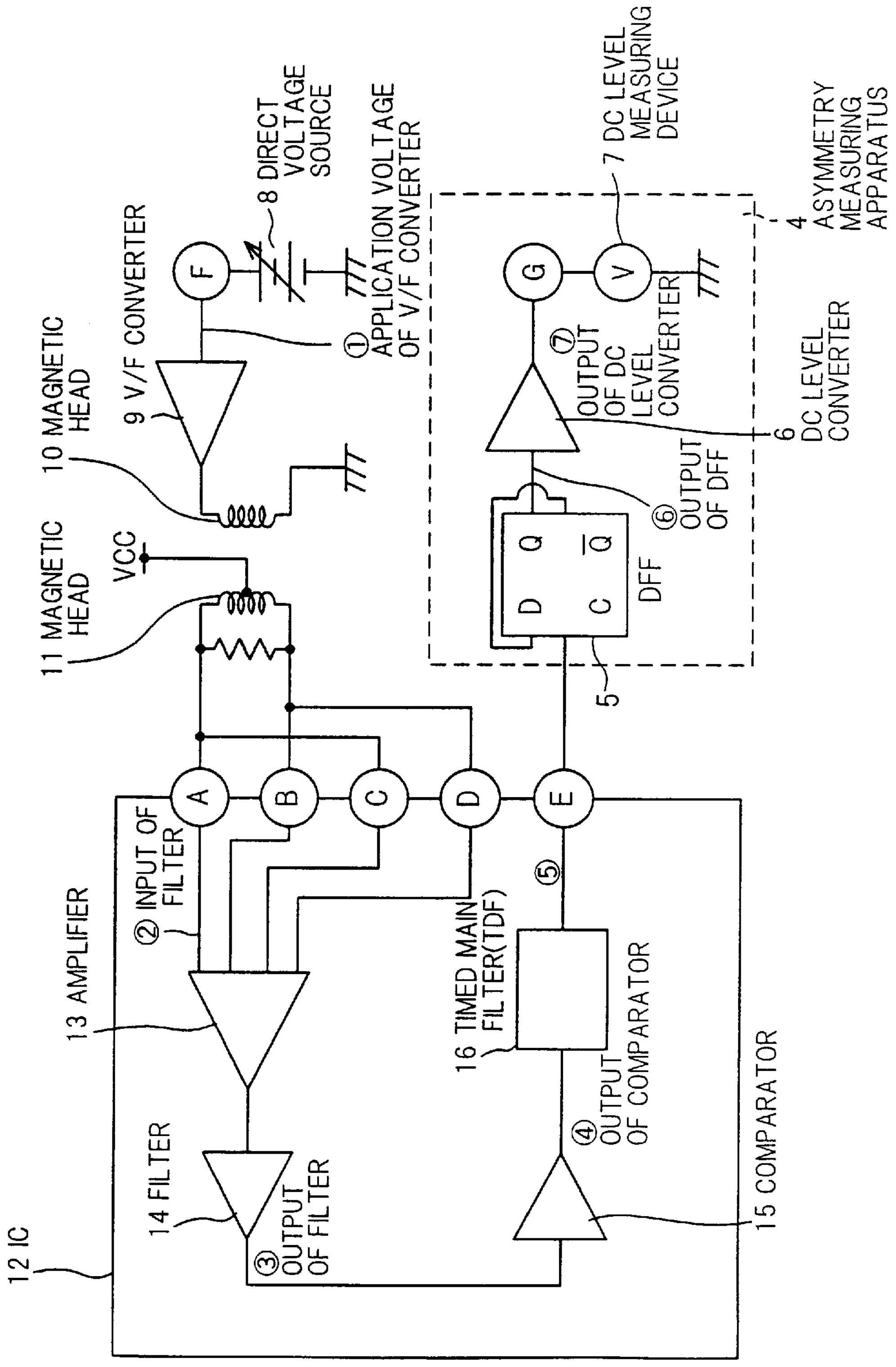
FIG. 4 is a circuit diagram showing one preferred embodiment of the invention.

FIG. 4 is a circuit diagram that illustrates in more detail the preferred embodiment of the invention. In FIG. 4, numeral 8 designates an output voltage-variable direct voltage source. Numeral 9 designates a V/F converter (a voltage-frequency converter) for outputting a sine wave of the frequency corresponding to the voltage applied to a terminal F. The output of the direct voltage source 8 is connected to the terminal F.

The output of the V/F converter 9 is connected to a magnetic head 10. Numeral 11 designates another magnetic head disposed opposite to the magnetic head 10, and these two magnetic heads are magnetically coupled with each other. The output of the magnetic head 11 is input into terminals A, B, C, and D of IC 12.

IC 12 comprises an amplifier 13, a filter 14, a comparator 15, and a timed main filter 16. The terminals A, B, C, and D of IC 12 are connected to the input of an amplifier 13. The output of the amplifier 13 is connected to the input of the filter 14. The output of the filter 14 is connected to the input of the comparator 15. The output of the comparator 15 is connected to the input of the timed main filter 16. The output of the timed main filter 16 is connected to a terminal E of IC 12.

The terminal E of IC 12 serves as the output terminal of IC 12. At the time of the measurement of the asymmetry, the output terminal is connected to the input terminal of the asymmetry measuring apparatus 4 according to the invention. The internal construction of the asymmetry measuring apparatus 4 is the same as that explained above in conjunction with FIG. 3.

Next, the operation of the construction of this preferred embodiment will be explained in conjunction with FIG. 3 (a block diagram) and FIGS. 6 and 7 (a waveform diagrams). A signal input into FDD 1 is input into the signal input section 2 and sent to the read data generator 3. The read data generator 3 shapes the waveform of the input signal and outputs read data.

Figure 6:
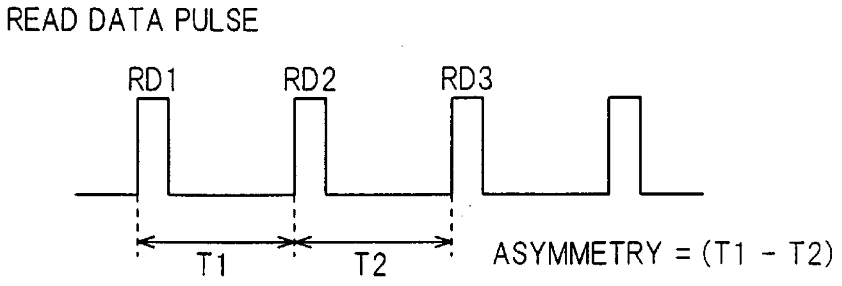
FIG. 6 is a waveform chart of read data.

The waveform of the read data is shown in FIG. 6. A difference in the time between the time T1 from the rise edge of read data RD1 to the rise edge of read data RD2 and the time T2 from the rise edge of read data RD2 to the rise edge of read data RD3, that is, T1–T2, is called "waveform asymmetry" or "asymmetry" that is one of important characteristics in reproduction of data by means of FDD.

The read data is output from FDD 1, and input into the asymmetry measuring apparatus 4 connected to the output terminal of FDD 1.

The read data input into the asymmetry measuring apparatus 4 is input into DFF 5.

Figure 7:
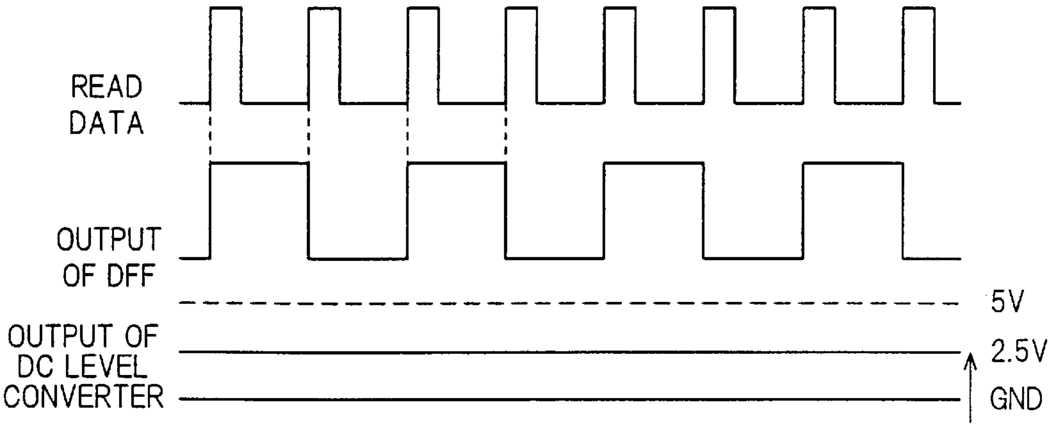
FIG. 7 is a waveform chart wherein the asymmetry is good.

DFF 5 divides the input and outputs a waveform shown in "OUTPUT of DFF" in FIG. 7. This output is input into the DC level converter 6. In the DC level converter 6, the output is converted to a DC voltage corresponding to the duty of the input waveform and then output. This output is input into the DC level measuring device 7 that measures the DC voltage.

Figure 5:
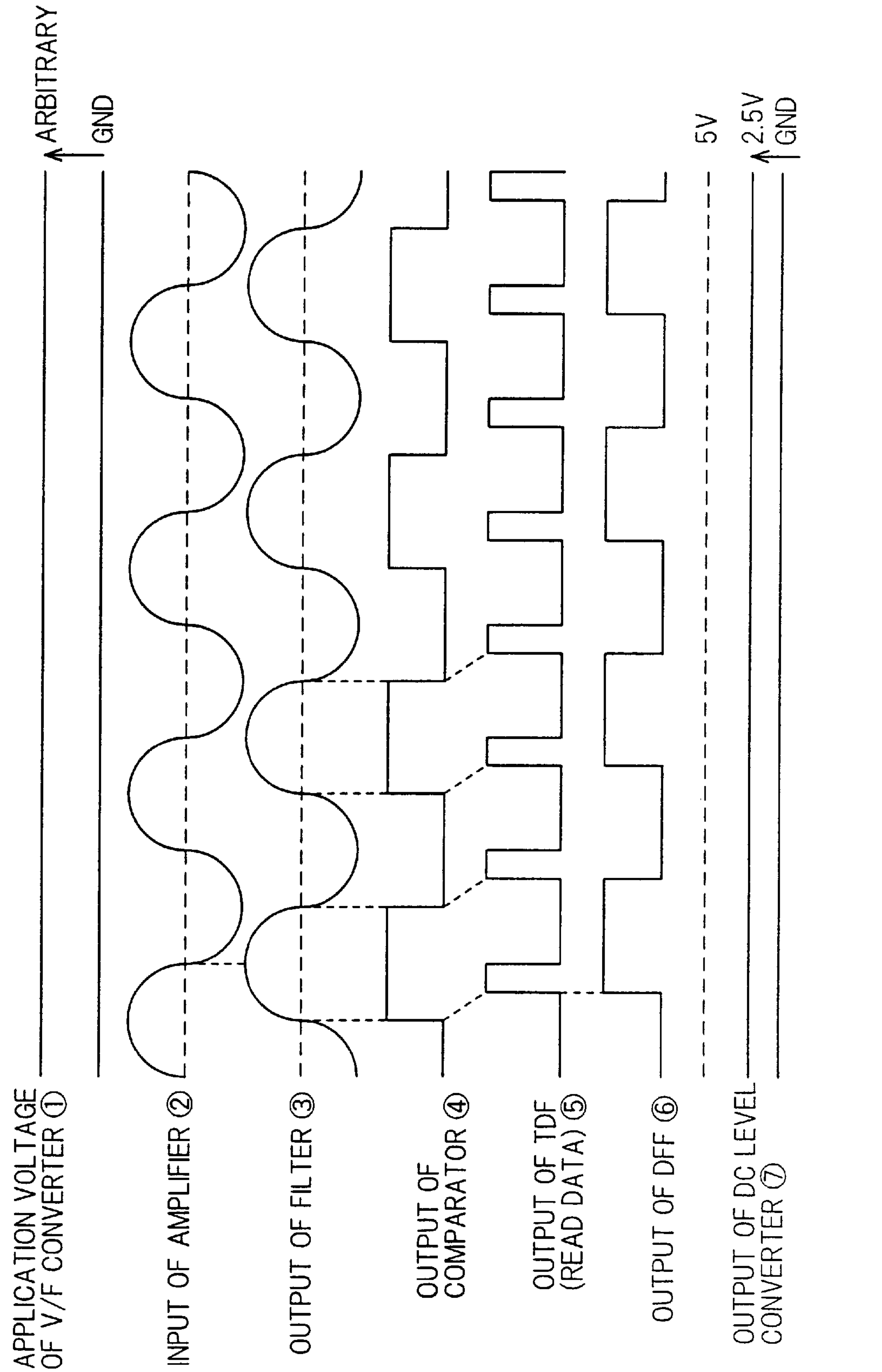
FIG. 5 is a waveform chart.

Next, the operation of the preferred embodiment will be explained in more detail in conjunction with FIG. 4 (a circuit diagram) and FIG. 5 (a waveform chart). An arbitrary direct voltage is output from an output voltage-variable direct voltage source 8, and applied to a terminal F as the input terminal of the V/F converter 9. The V/F converter 9 outputs a sine wave of the frequency corresponding to the direct voltage.

The output of the V/F converter 9 is input into the terminals A, B, C, and D of IC 12 through the magnetic heads 10, 11, and input into the amplifier 13 connected to these terminals. The waveform input into the terminal A is shown in FIG. 5. This input is amplified by the amplifier 13, and input into the filter 14. The filter 14 outputs a waveform which has been obtained by differentiating the input. The output of the filter 14 is input into the comparator 15. This input is converted by the comparator 15 to a rectangular wave and output. This output is input into the timed main filter (TDF) 16, and read data is generated from a rise edge and a fall edge of the input waveform. This read data is output from the terminal E of IC 12.

The output read data is input into the asymmetry measuring apparatus 4, and input into DFF 5. DEF 5 divides the read data, and outputs a waveform. This waveform is converted to a DC voltage level corresponding to the duty of the waveform in the DC level converter 6, and then output. The output DC voltage is measured with the DC level measuring apparatus 7.

As shown in a waveform chart of FIG. 7, adjustment is performed so that, when the pulse spacing of read data is constant with asymmetry characteristics being in the best state, the output of the DC level converter 6 is 2.5 V. When the pulse spacing of read data is not constant with asymmetry characteristics being not good, the duty of the output waveform of DFF 5 is not 50% and the output of the DC level converter deviates from 2.5 V.

Figure 8:
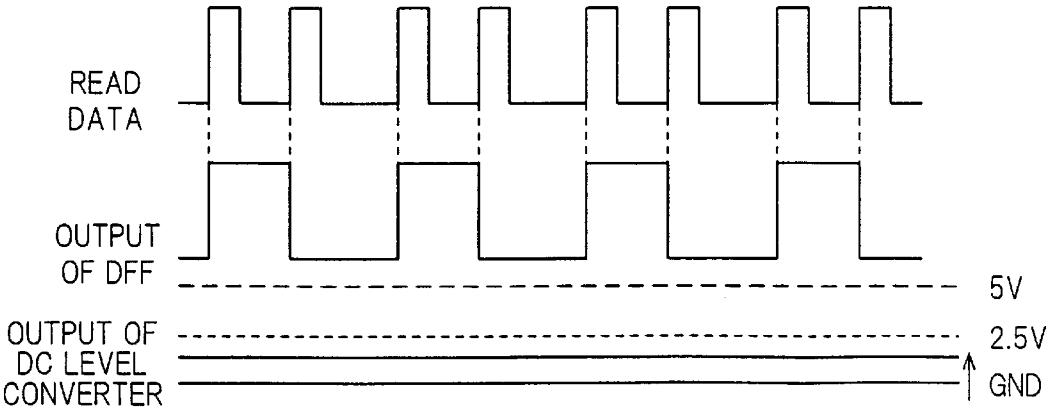
FIG. 8 is a waveform chart wherein the asymmetry is not good.

When the read data has a waveform shown in FIG. 8, the duty of the output of DFF 5 is less than 50% and the output of the DC level converter is less than 2.5 V. On the other hand, when the duty is more than 50%, the output of the DC level converter is more than 2.5 V. In any case, it can be judged that the asymmetry characteristics deteriorate with an increase in the degree of deviation of the output of the DC level converter 6 from 2.5 V.

As described above, the asymmetry measuring apparatus comprises: dividing means for dividing read data output from a read data generator in data storing means; a DC level converter for converting the duty ratio of a signal divided by the dividing means to a DC voltage level; and DC voltage measuring means for measuring the output voltage of the DC level converter. By virtue of this constitution, time measurement can be replaced with DC voltage measurement. This can solve a problem of quantization errors created in time measurement using a reference clock and can realize an asymmetry measuring apparatus which causes no significant measuring error. Further, use of a flip-flop as the dividing means can provide an asymmetry measuring apparatus having simple construction.

The invention has been described in detail with particular reference to preferred embodiments, but it will be understood that variations and modifications can be effected within the scope of the invention as set forth in the appended claims.

What is claimed is:

1. An asymmetry measuring apparatus comprising:

dividing means for dividing read data output from a read data generator in data storing means;

a DC level converter for converting the duty ratio of a signal divided by the dividing means to a DC voltage level; and DC voltage measuring means for measuring the output voltage of the DC level converter.

2. The asymmetry measuring apparatus according to claim 1, wherein the dividing means is a flip-flop.

3. The asymmetry measuring apparatus according to claim 1, wherein the data storing means is a floppy disk drive.

4. The asymmetry measuring apparatus according to claim 2, wherein the data storing means is a floppy disk drive.

5. An asymmetry measuring method comprising the steps of:

dividing read data read and output from data storing means;

converting the duty ratio of the divided signal to a DC voltage level; and measuring the DC voltage level.

* * * * *